(12) United States Patent
Gloor

(10) Patent No.: US 6,631,735 B2
(45) Date of Patent: Oct. 14, 2003

(54) SANITARY FITTING

(75) Inventor: Herbert Gloor, Unterkulm (CH)

(73) Assignee: KWC AG, Unterkulm (CH)

( * ) Notice: Subject to any disclaimer, the term of this patent is extended or adjusted under 35 U.S.C. 154(b) by 74 days.

(21) Appl. No.: 09/994,857

(22) Filed: Nov. 28, 2001

(65) Prior Publication Data

US 2002/0117220 A1 Aug. 29, 2002

(30) Foreign Application Priority Data

Feb. 27, 2001 (EP) .............................................. 01104765

(51) Int. Cl.[7] .................................................. E03C 1/02
(52) U.S. Cl. ...................................................... 137/801
(58) Field of Search ........................................ 137/801

(56) References Cited

FOREIGN PATENT DOCUMENTS

| DE | 196 08 482 A1 | 10/1996 |
|---|---|---|
| EP | 447 777 A1 | 2/1991 |
| WO | WO 91/07614 | 5/1991 |

*Primary Examiner*—Gerald A. Michalsky
(74) *Attorney, Agent, or Firm*—Oliff & Berridge PLC

(57) ABSTRACT

The sanitary fitting is intended for two different qualities of water and, for this purpose, has outlet connecting branches (20, 21) which are separate from one another and into which two channel systems (50, 56), which are routed separately from one another through a common fitting housing (1), open out. Each channel system (50, 56) is provided with a valve arrangement (53, 17), each valve arrangement being functionally separate from the other and of which the top valve arrangement (17), assigned to the channel system (56), has a closure body (41) which executes a lifting movement and of which the actuating element (44) forms the top termination of the sanitary fitting. In order for it to be possible for the actuating element to be easily operated even with a comparatively high pressure in the channel system (56) which is to be closed, as is the case, for example, in drinking water enriched with carbon dioxide, a pressure-equalizing channel (82), which is routed through the valve closure body (41), connects the channel system (56) to a pressure-equalizing space (80), which is provided on the rear end surface (81) of the valve closure body (41).

12 Claims, 5 Drawing Sheets

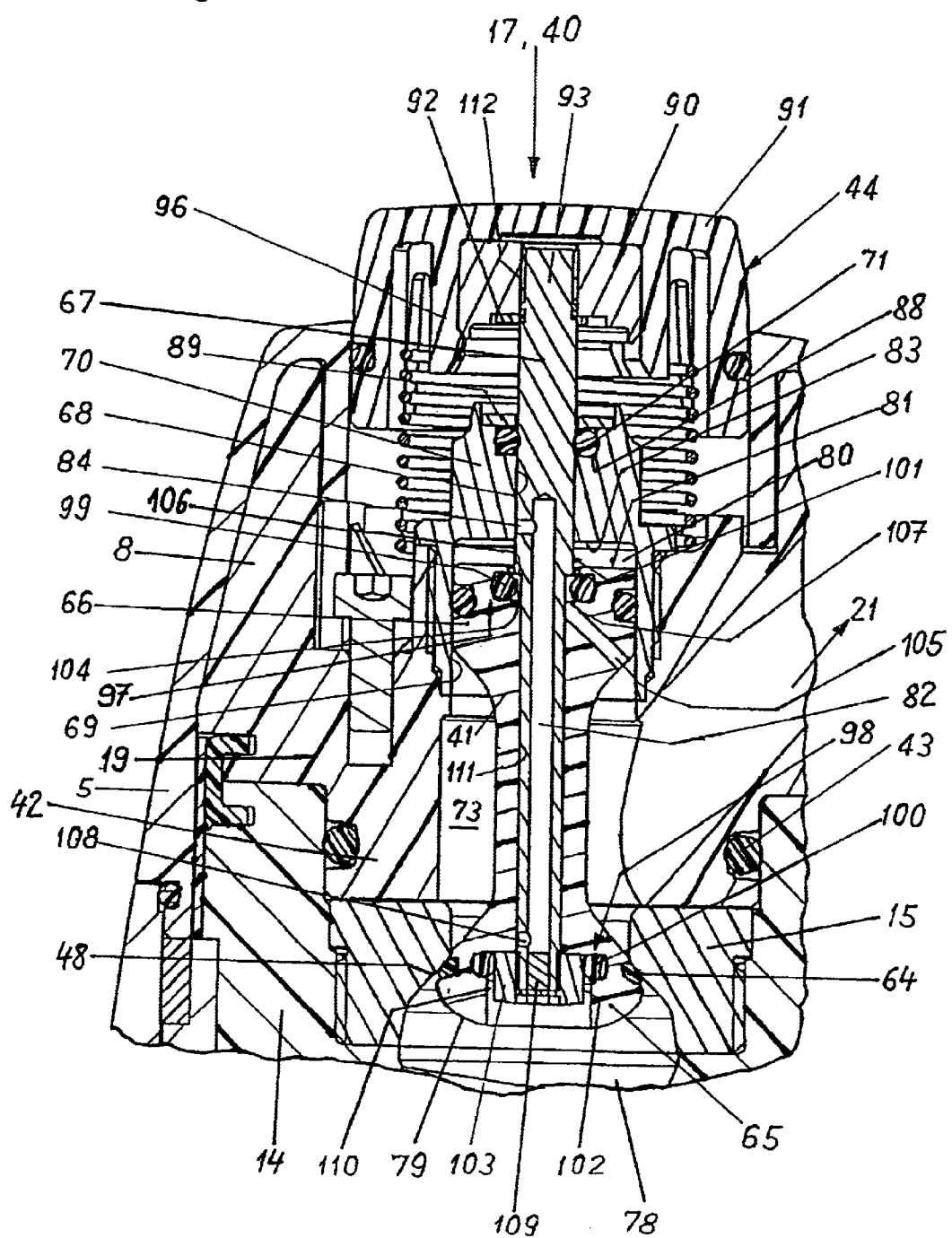

SANITARY FITTING

BACKGROUND OF THE INVENTION

1. Field of Invention

The invention relates to a sanitary fitting with two outlet connecting branches which are intended for different qualities of water, separate from one another and into which two channel systems, which are routed separately from one another through a common fitting housing, open out, each channel system being provided with at least one valve arrangement, each valve arrangement being functionally separate from the other, and to a lifting-valve arrangement which is suitable for such a sanitary fitting.

2. Description of Related Art

Sanitary fittings of this type are known from EP-A-0 501 989 and DE-A-196 08 482. These sanitary fittings have three separate supply lines, on the one hand for cold and hot service water, with a common outlet for mixed water, and on the other hand a supply line for drinking water, which has been prepared in a filter device arranged on the inflow side and/or in a separate apparatus for admixing carbon dioxide. For the separate removal of service water and drinking water, these prior publications have different design solutions, both using a valve arrangement in which an actuating element executes a lever movement and a rotary movement of a closure body brings about continuous opening of the outlet channel. This has the disadvantage that, in particular for the removal of drinking water which is subjected to relatively high pressure, e.g. carbonated, the actuation of the valve arrangement and metering of the quantity of drinking water flowing out require particular care and attention. On the other hand, there is the advantage that the pressure in the channel system which is to be shut off does not have any significant effect on the actuating force of the lever movement.

SUMMARY OF THE INVENTION

The object of the invention is to provide a sanitary fitting which is suitable, in particular, for the separate discharge of filtered water or carbonated drinks, in particular water, can be operated easily and with a low level of force being applied and makes it easier for a quantity of water to be metered. Moreover, the sanitary fitting is intended to be easy to produce and/or to assemble. This object is achieved according to the invention by the features of patent claim 1. Preferred configurations of the invention form the subject matter of the dependent patent claims and can be gathered from the following description with reference to the drawings, in which:

BRIEF DESCRIPTION OF THE DRAWINGS

FIG. 5 shows an enlarged illustration of part of the sanitary fitting according to FIG. 4 with the valve closed.

DETAILED DESCRIPTION OF PREFERRED EMBODIMENTS

Figure 1:
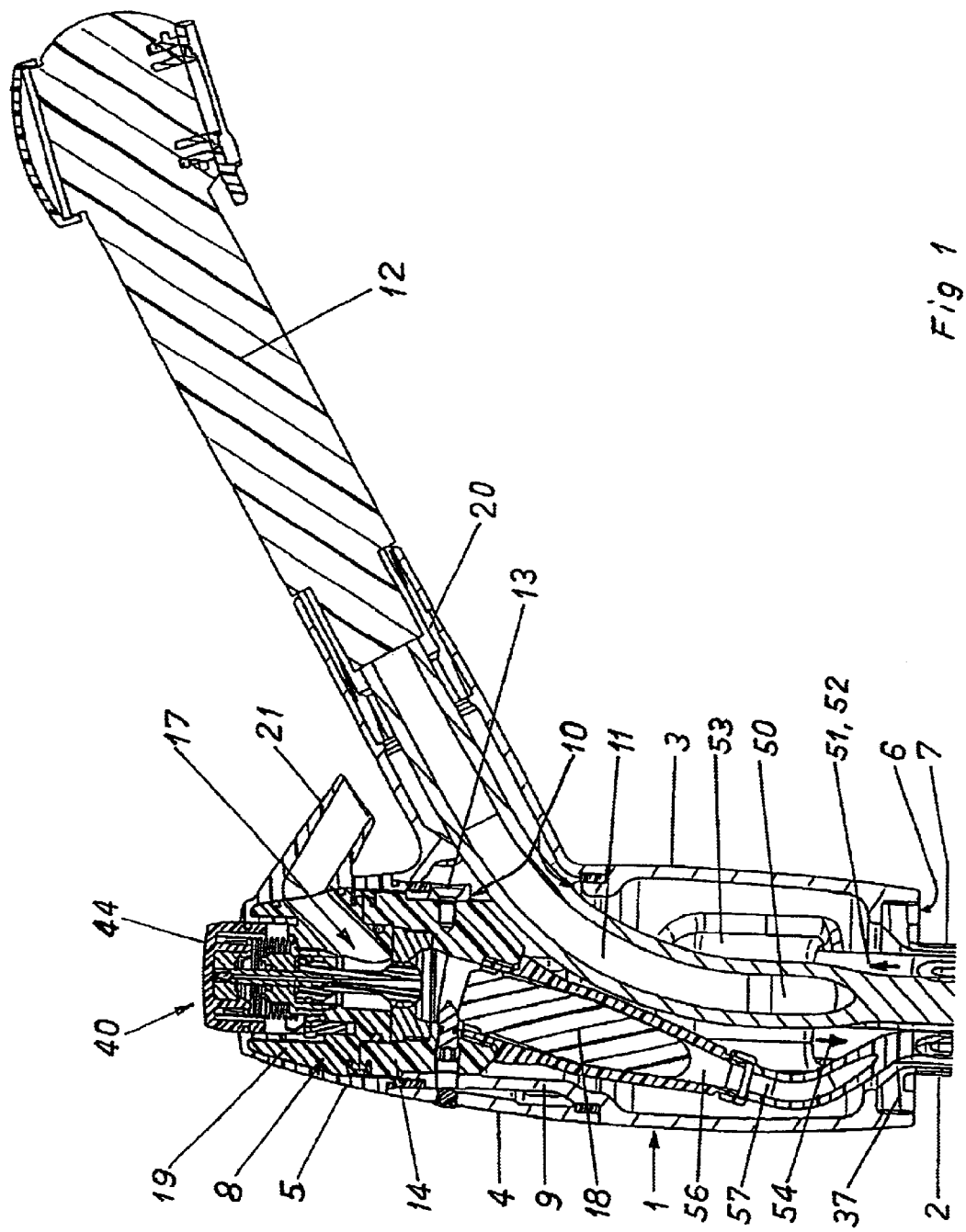
FIG. 1 shows an axial section through a sanitary fitting with a first embodiment of a valve arrangement.

As the illustration of FIG. 1 shows overall, the sanitary fitting has a column-like fitting housing 1 which is assembled from a number of parts and has a base part 3, a central housing part 4 and a housing head 5.

The base part 3 is closed by a screwed-in flange border 37 of a bottom connecting branch 2 and forms, together therewith, a bottom standing surface 6, which is intended for abutment against an essentially horizontally running sink edge (not illustrated) or a sink unit. The fitting housing 1 is fixed by being secured with clamping action by means of a nut which can be screwed onto the external thread 7 of the connecting branch 2 and is supported on the underside of the sink edge or of the unit top.

The base part 3 merges integrally in the upward direction into an inner housing connecting branch 9, which extends over a considerable part of the central housing part 4 and is thus enclosed by the latter. A lateral opening 10 in the housing connecting branch 9 serves for the hose 11 of a hand spray 12 to be guided out laterally.

Furthermore, in its top region, the housing connecting branch 9 bears a bottom installation body 14, which is connected to said connecting branch in a rotationally fixed manner by a radially directed screw 13 and, together with a top installation body 19, forms an inner housing body 8. The bottom installation body 14 serves for accommodating and fastening a valve seat body 15 of a valve arrangement 17, and the top installation body 19 serves for accommodating an actuating means 40 of said valve arrangement 17.

The central housing part 4 and the housing head 5 each merge laterally into an integrally formed outlet connecting branch 20, 21. The bottom outlet connecting branch 20 runs obliquely upwards in order, in a manner known per se, for example, from EP-A-0 447 777, to serve for securing and guiding the hand spray 12. The top outlet connecting branch 21, which is provided for prepared water, is directed obliquely downward, with the result that the water can be discharged in a specifically directed manner into a drinking vessel which is held up to the connecting branch.

The housing base 3, the central housing part 4 and the housing head 5 are plugged telescopically one inside the other and are supported in a form-fitting manner on one another by the contact between encircling shoulders 22, 23 and end surfaces 24, 25 and, moreover, are mounted, and sealed, in a rotatable manner in relation to one another by sliding rings 26, 27 arranged in said regions and by an O-ring 28. The central housing part 4 is thus fixed axially between the housing base 3 and the housing head 5.

The housing base 3 and the housing head 5 are connected axially via the bottom installation body 14, which is fastened on the housing base 3 and/or the housing connecting branch 9 thereof by the screw 13. One or more screws 29, which are countersunk in the top installation body 19, connect the latter to the head part 5. In order, despite the rotationally fixed connection, produced by the screw 13, between the housing base 3 and bottom installation body 14 of the inner housing body 8, to ensure that the housing head 5 and/or its outlet connecting branch 21 can be rotated into an alterable, ready-for-use position relative to the housing base 3, the bottom and top installation bodies 14, 19 are connected to one another such that they can be rotated in relation to one another. For this purpose, said installation bodies have grooves 32, 33 which run round parallel to their abutting radial surfaces 30, 31 and into which two cross-sectionally U-shaped half-rings 34, 35 are pushed radially from the outside. A sleeve 36 which is pushed on over the latter secures the half-rings 34, 35 in the grooves 32, 33.

It can be gathered from the above description of the construction of the column-like fitting housing 1 that the assembly of the sanitary fitting can easily be executed in a precise manner. For this purpose, the bottom installation body 14, together with the compensator body 16 screwed into it and the likewise screwed-in valve seat body 15 of the valve arrangement 17, is pushed into the housing connecting branch 9 of the housing base 3, with the result that its encircling shoulder 38 stops against the top end surface 39 of the same. Thereafter, the top installation body 19, together with at least part of the actuating device 40 of the valve arrangement 17 and the valve closure body 41 thereof, is inserted into the bottom installation body 14, with the result that its connecting branch, together with an O-ring seal 43, penetrates in a form-fitting and sealing manner into the same. Thereafter, the central housing part 4 along with the accommodating connecting branch 20 for the hand spray 12 and the housing head 5 with the outlet connecting branch 21 for drinking water are pushed from above onto the arrangement thus provided and are secured by the screw 29. Finally, the actuating button 44 of the actuating device 40 of the valve arrangement 17, together with an O-ring seal 45 provided on its circumference, is pushed into an inner housing connecting branch 46 of the housing head 5 and connected to the actuating device 40 by being latched in.

Figure 3:
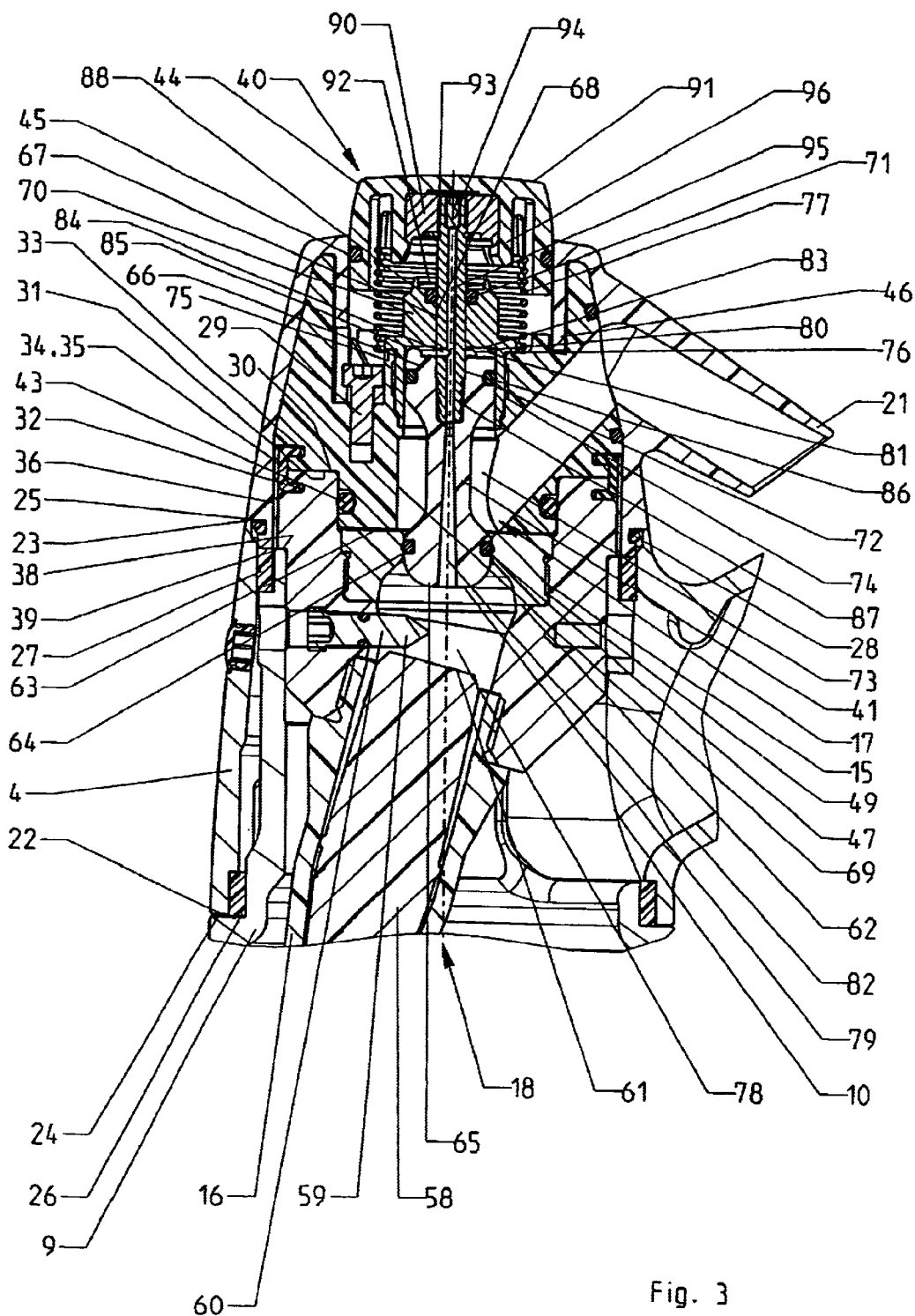
FIG. 3 shows an enlarged illustration of part of the sanitary fitting according to FIGS. 1 and 2 with the valve closed and without the hand spray inserted.

Of course, the insertion of the top installation body 19 into the bottom installation body 14 together with the valve closure body 41 requires a valve design in which the valve closure body 41 can be pushed through the valve seat body 15 in order to be moved into an open valve position and, accordingly, assumes its sealing position corresponding to the illustration in FIG. 3 against a cylindrical inner surface 47 of the valve seat body 15. In contrast, in the case of a valve arrangement 17 (according to FIGS. 4 and 5) with a sealing position against an inflow-side/surface 48 of the valve seat body 15, it is necessary to provide the valve closure body 41 together with the valve seat body 15 beforehand on the bottom installation body 14, with the result that it can only be connected to the associated actuating device 40 during or following the insertion of the top installation body 19.

The channel system 50 of the sanitary fitting which is provided for service water is configured in a manner similar to that shown in FIG. 1 of EP-A-0 477 777 by a cold-water and hot-water line 51, 52, routed through the connecting branch 2 being connected to a mixing cartridge 53, from which a mixed-water line 54 is routed outward through the connecting branch 2 in order to open out in the hose 11 of the hand spray 12 via a supply loop, which hangs beneath the sanitary fitting. The mixing cartridge 53 is actuated from the outside by an actuating device which is arranged laterally on the fitting housing 1, on the rear side in the drawings, and thus cannot be seen in the latter, and comprises a rotary knob or a lever.

The channel system 56 provided for prepared water or drinking water has a connection line 57 which is introduced through the bottom connecting branch 2 and is connected to the funnel-shaped compensator housing 16. The position of the spindle-like regulating body 58, which serves as a pressure compensator, is determined by the abutment position against the conical oblique surface 59 of an adjusting screw 60 screwed laterally into the inner housing body 8. Lateral centering protrusions 61 serve for securing the central position of the regulating body 58, around which flow takes place, in the funnel-shaped compensator housing 16. Since the pressure compensation is only necessary for water which has been carbonated, and correspondingly is subjected to a relatively high pressure of approximately 5 bar, or other carbonated drinks, the spindle-like regulating body 58 may be omitted and/or removed for water which is prepared merely by filtering.

The drawings show two exemplary embodiments of the lifting-valve-containing valve arrangement 17. Since these have a number of common features, corresponding parts have the same designations. A first exemplary embodiment is explained in more detail hereinbelow with reference to FIGS. 2 and 3.

The housing 8 of the valve arrangement 17 comprises a bottom housing body 14 and a top housing body 19, which engage in a form-fitting manner one inside the other via a connecting branch 42 and are sealed in relation to one another by an O-ring 43 provided on the connecting branch. In order for it to be possible to alter the circumferential position of the outlet connecting branch 21 relative to the bottom housing body 14, which is provided for a fixed arrangement, they are fastened on one another in the axial direction such that they can be rotated in relation to one another. For this purpose, use is made of two cross-sectionally u-shaped half-rings 34, 35, which are inserted into encircling grooves 32, 33 radially from the outside. A sleeve 36 which is pushed on over the half-rings 34, 35 secures the latter in this position. It is possible to dispense with the sleeve 36 and, as appropriate, to design the half-rings 34, 35 such that they can be snapped in in a self-retaining manner.

The valve seat body 15 is screwed to the inner wall 49 of the bottom housing body 14 and enclosed between an inner shoulder 62 and the end side 63 of the connecting branch 42, with the result that it is retained in a fixed manner together with the bottom housing body 14.

The valve closure body 41 is elongate and narrowed centrally and forms, by way of one end, a closure part 65 which interacts with a sealing ring 64, while its other end forms a guide piston 66, from which a valve stem 67 extends away in the manner of a piston rod. This guide piston 66 of the valve closure body 41 and the valve stem 67 are guided in bores 68, 69 which are graduated in relation to one another and belong to a sealing body 70 provided in the top housing body 19, with the result that said sealing body assisted by sealing rings 71, 72, seals the valve space 73 in the outward direction. The sealing body 70 is accommodated, with thread engagement, by the top part of a central bore 74 of the top housing body 19 and butts, by way of a shoulder surface 75, against a planar radial surface 76 of the same.

Fastened at the outer end of the valve stem 67 is an actuating button 44, which is enclosed by part of the top installation body 19 and by the head part 5 of the housing, with the result that it projects in an easily reachable manner beyond the same. A helical spring 77 arranged between the actuating button 44 and the sealing body 70 resiliently cushions the actuating button 44 as it is pressed down from its uppermost position illustrated in FIG. 3, and assists the rearward movement of the valve closure body 41 into the closure position once the actuating button 44 has been released.

The pressure of the water in the channel part 78 which is to be closed acts on the end surface 79 of the closure part 65, said end surface being directed toward said channel part, and thus counteracts a pressure on the actuating button 44. Since this pressure, in particular for shutting off water enriched with carbon dioxide, would be too great in order to press down the button with a force which is limited for comfortable operation, a pressure-equalizing channel 82 is provided, this connecting the channel part 78 which is to be closed to a pressure-equalizing space 80 provided on the rear end surface 81 of the valve closure body 41.

By virtue of the guidance of the guide piston 66 in the sealing body 70, the pressure-equalizing space 80 is bounded by the bore 69, provided for the guidance, and its inner transverse surface 83, which runs radially as far as the valve stem 67. The magnitude of the counterpressure force is thus proportional to the magnitude of said transverse surface 83 and/or proportional to the equally sized end surface 81 of the guide piston 66, said end surface bounding the pressure-equalizing space 80.

Figure 2:
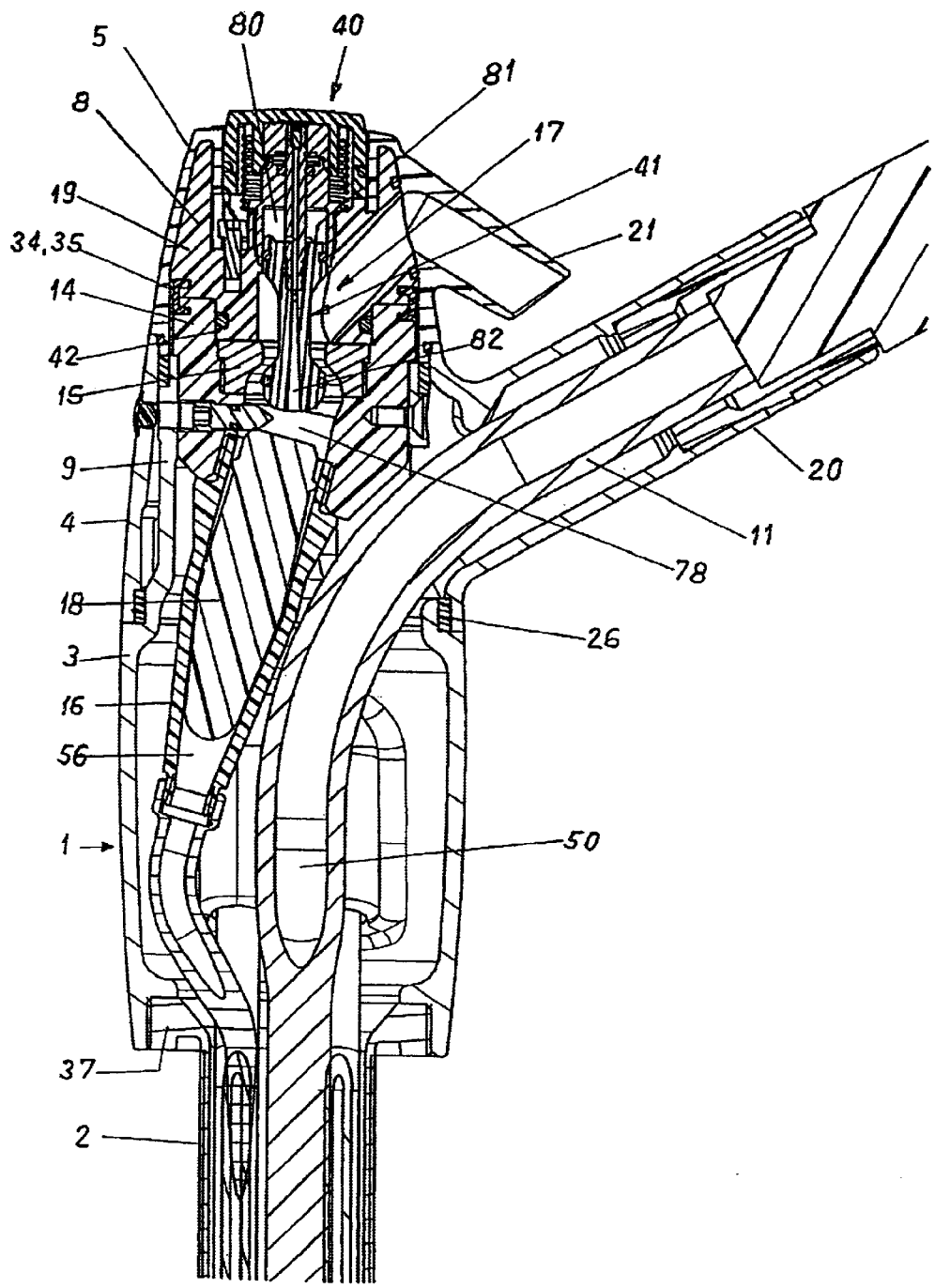
FIG. 2 shows an enlarged illustration of the sanitary fitting according to FIG. 1 with the valve open and a hand spray inserted.

The pressure-equalizing channel 82, corresponding to the illustration in FIG. 2 or 3, is preferably routed axially, as a bore, through the valve closure body 41 and part of the valve stem 67 and has at least one transverse bore 84 in the valve stem 67, with the result that said axial bore is connected to the pressure-equalizing space 80 in order to complete the pressure-equalizing channel 82.

Provided on the end surface 81 of the guide piston 66 of the valve closure body 41 are spacer protuberances 85, which prevent the magnitude of the pressure-equalizing space 80 being reduced to zero, and consequently the transverse bore 84, and thus the pressure-equalizing channel 82, is closed by the wall of the bore 68, which guides the valve stem 67.

The centrally narrowed valve closure body 41 is produced, for example, by diecasting from a material suitable for this purpose, e.g. plastic, and is provided in the process with a slightly conical, central pressure-equalizing channel 82. In the region of its guide piston 66, said pressure-equalizing channel merges into an accommodating bore 86 for the valve stem 67, the latter being retained in said bore by a press fit, which facilitates assembly. A surface profiling 87 in the relevant region of the valve stem improves the anchoring of the press fit.

The O-ring 71, which performs the task of sealing the valve stem 67 in the sealing body 70, can easily, in the state in which it is pushed over the valve stem 67, be pushed into a recess 88 of the sealing body 70, where it is then secured by a pressed-in washer 89.

The actuating button 44 at the outer end of the valve stem 67 comprises a cylindrical inner button body 90 and a cap-like button housing 91 enclosing the same. The inner button body 90 is screwed onto the valve-stem end 93, which is provided with a screw thread, until it stops against a circlip ring or securing ring 92 which engages in a groove of the valve stem 67. The valve-stem end 93 encloses a screwed-in closure pin 94, which closes the continuous central channel 95. The closure pin 94 allows venting of the pressure-equalizing channel 82 and of the pressure-equalizing space 80. Provided for fastening the cap-like button housing 91 on the inner button body 90 is a latching connection which comprises a cross-sectionally hook-shaped inner latching sleeve 96, having a number of longitudinal slots, and is integrally formed concentrically on the button housing 91. It is thus possible for the button housing 91 to latch in the manner of a push-button onto the button body 90, fastened on the valve stem 67.

A further exemplary embodiment of a top, lifting-valve-containing valve arrangement 17 is explained in more detail hereinbelow, with reference to FIGS. 4 and 5.

The housing 8 of the valve arrangement 17 comprises a bottom housing body 14 and a top housing body 19, which engage in a form-fitting manner one inside the other via a connecting branch 42 and are sealed in relation to one another by an O-ring 43 provided on the connecting branch 42. In order for it to be possible to alter the circumferential position of the outlet connecting branch 21 relative to the bottom housing body 14, which is provided for a fixed arrangement, they are fastened on one another in the axial direction such that they can be rotated in relation to one another. For this purpose, use is made of two cross-sectionally u-shaped half-rings 34, 35, which are inserted into encircling grooves 32, 33 radially from the outside. A sleeve 36 which is pushed on over them secures the latter in this position. As has been described above, it is possible to dispense with the sleeve 36.

The valve seat body 15 is screwed to the inner wall 61 of the bottom housing body 14 and enclosed between an inner shoulder 62 and the end side 63 of the connecting branch 42, with the result that it is retained in a fixed manner together with the bottom housing body 14.

The valve closure body 41 is elongate and narrowed centrally and forms, by way of one end, a closure part 65 which interacts with a sealing ring 64, while its other end forms a guide piston 66, from which a valve stem 67 extends away in the manner of a piston rod. This guide piston 66 of the valve closure body 41 and the valve stem 67 are guided in bores 68, 69 which are graduated in relation to one another and belong to a sealing body 70 provided in the top housing body 19, with the result that said sealing body assisted by sealing rings 71, 72, seals the valve space 73 in the outward direction. The sealing body 70 is accommodated, with thread engagement, by the top part of a central bore 74 of the top housing body 19 and butts, by way of a shoulder surface 75, against a planar radial surface 76 of the same.

Fastened at the outer end of the valve stem 67 is an actuating button 44, which is enclosed by part of the top installation body 19, with the result that it projects in an easily reachable manner beyond the same. A helical spring 77 arranged between the actuating button 44 and the sealing body 70 resiliently cushions the actuating button 44 as it is pressed down from its uppermost position illustrated in FIG. 5.

The pressure of the water in the channel part 78 which is to be closed acts on the end surface 79 of the closure part 65, said end surface being directed toward said channel part, and thus counteracts a pressure on the actuating button 44. Since this pressure, in particular for shutting off water enriched with carbon dioxide, would be too great in order to press down the button 44 with a force which is limited for comfortable operation, a pressure-equalizing channel 82 is provided, this connecting the channel part 78 which is to be closed to a pressure-equalizing space 80 provided on the rear end surface 81 of the valve closure body 41.

By virtue of the guidance of the guide piston 66 in the sealing body 70, the pressure-equalizing space 80 is bounded by the bore 69, provided for the guidance, and its inner transverse surface 83, which runs radially as far as the valve stem 67. The magnitude of the counterpressure force is thus proportional to the magnitude of said transverse surface 83 and/or proportional to the equally sized end surface 81 of the guide piston 66, said end surface bounding the pressure-equalizing space 80.

Figure 4:
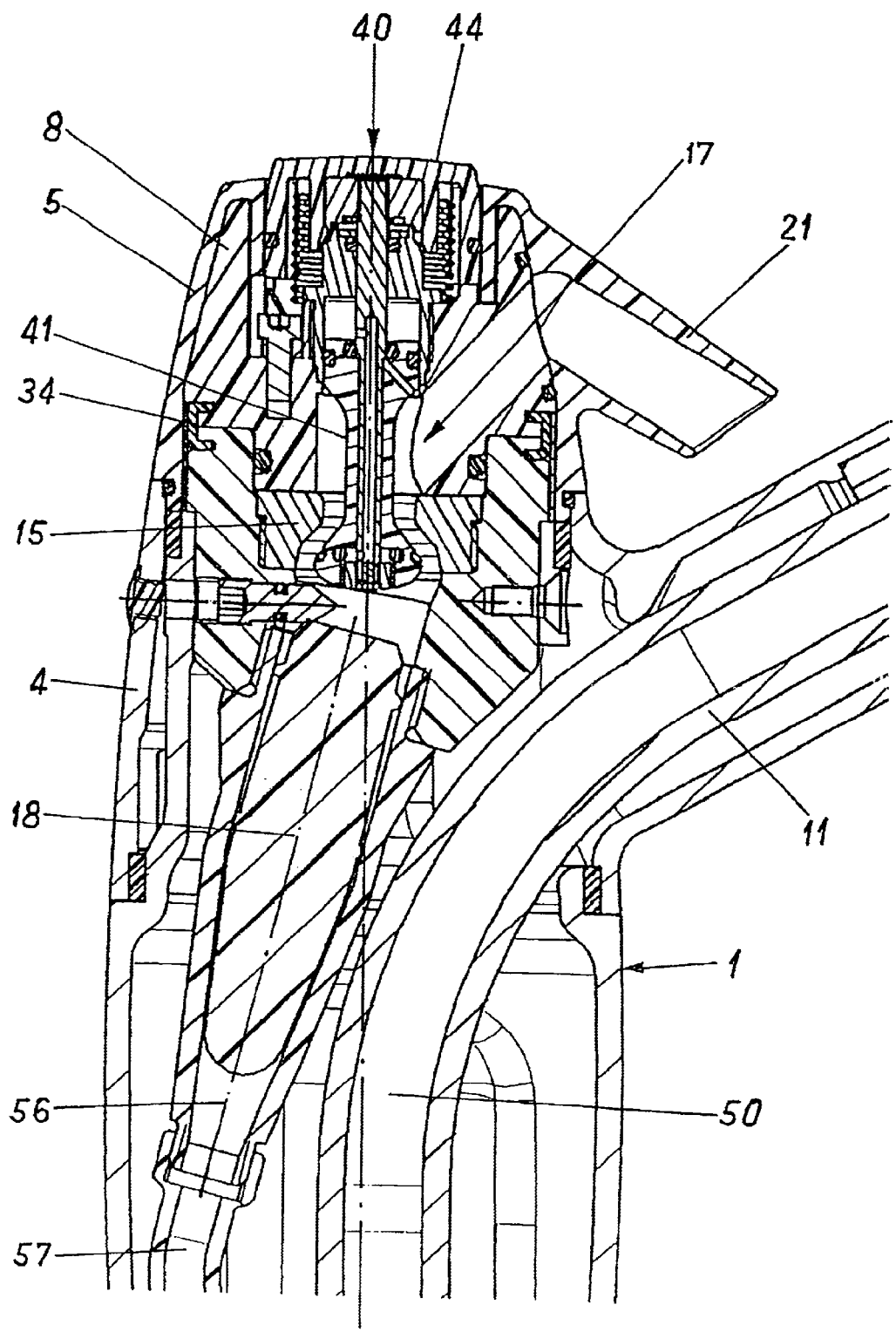
FIG. 4 shows an enlarged illustration of a sanitary fitting with a second embodiment of a valve arrangement and the hand spray inserted, the valve being open.

The pressure-equalizing channel 82, corresponding to the illustration in FIG. 4 or 5, is preferably routed axially, as a bore, through the valve closure body 41 and part of the valve stem 67 and has at least one transverse bore 84 in the valve stem 67, with the result that said axial bore may be connected to the pressure-equalizing space 80 in order to complete the pressure-equalizing channel 82.

However, corresponding to the illustration in FIG. 5 with the valve closed, i.e. when the closure part 65 is located in the closure position on the valve seat body 15, the connection to the pressure-equalizing space 80 is likewise closed. This is achieved by a pilot-valve system, of which the control element is formed by the valve stem 67. For this purpose, the latter is guided such that it can be displaced to a limited extent in the valve closure body 41, and is provided with a closure device 97, 98 at each of its two ends. These closure devices 97, 98 each have a respective O-ring 99, 100 which is retained in a groove of the valve closure body 41 and with which, respectively, a circumferential part 101 of the valve stem 67 and the cylindrical circumferential surface 102 of a sealing seat body 103, fastened at the end of the valve stem 67, come into sealing contact.

The closure devices 97, 98 come into action alternately. As the valve closure position according to FIG. 5 shows, the valve stem 67 has been displaced upward relative to the valve closure body 41, with the result that the end closure body 103 is in sealing contact with the O-ring 100, while the circumferential part 101 is spaced apart from the associated O-ring 97 by a distance 104, with the result that the pressure-equalizing space 80 is connected, past the O-ring 99, to a venting channel 105, which runs through the guide piston 66 and is routed outward to the outlet connecting branch 21. As a result, the closure part 65 of the valve closure body 41 is subjected to a closure force which is proportional to the difference in pressure between the channel part 78 which is to be shut off and the atmospheric pressure present in the outlet connecting branch 21.

In order to open the valve, in contrast, it is not necessary for a force corresponding to such a pressure to be applied to the actuating button 44, because, by means of the pilot-valve system, a corresponding counterpressure is built up beforehand in the pressure-equalizing space 80. During the pressing-down operation, the actuating button 44 first of all only moves the valve stem 67 downward, until the latter has stopped, by way of a shoulder 106 adjacent to its sealing circumferential part 101, against an inner shoulder 107 of the valve closure body 41, said inner shoulder being adjacent to the O-ring 99. Upon reaching this position, the circumferential part 101 of the valve stem 67 moves into sealing contact with the O-ring 99, and the sealing seat body 103 at the bottom of the valve stem 67 is released from sealing contact with the O-ring 100. At the same time, the top transverse bore 84 of the pressure-equalizing channel 82 moves downward into the pressure-equalizing space 80, while another transverse bore 108 in the region of the bottom end of the valve stem 67, said end being closed by a pin 109, moves to a gap 110 which, by way of the detachment of the sealing seat body 103 from the O-ring 100, fully forms past the same, this resulting in the opening of a connection between the pressurized channel part 78 and the pressure-equalizing space 80. The counterpressure which thus builds up there in a slowed-down manner on account of the numerous narrowings makes it easier for the valve closure body 41 then to be pressed down as far as a fully open valve position corresponding to the illustration in FIG. 4.

The centrally narrowed valve closure body 41 is produced, for example, by diecasting from a material suitable for this purpose, e.g. plastic, and provided with a continuous axial bore 111 for the guidance of the valve stem 67, which is designed as a valve-control element. Said valve stem encloses the pressure-equalizing channel 82, configured as an axial bore, in the region of the valve closure body 41, while it is of solid configuration in its top region, connected to the actuating button 44.

The O-ring 71, which performs the task of sealing the valve stem 67 in the sealing body 70, can easily, in the state in which it is pushed over the valve stem 67, be pushed into a recess 88 of the sealing body 70, where it is then secured by a pressed-in washer 89.

The actuating button 44 at the outer end of the valve stem 67 comprises a cylindrical inner button body 90 and a cap-like button housing 91 enclosing the same. The inner button body 90 is screwed onto the valve-stem end 93, which is provided with a screw thread 112, until it stops against a securing ring 92 which engages in a groove of the valve stem 67. Provided for fastening the cap-like button housing 91 on the inner button body 90 is a latching connection which is formed by a cross-sectionally hook-shaped inner latching sleeve 96, having a number of longitudinal slots, and is integrally formed concentrically on the button housing 91. It is thus possible for the button housing 91 to latch in the manner of a push-button onto the button body 90, fastened on the valve stem 67.

It is also possible, in the case of the fitting according to FIGS. 4 and 5, for the venting channel 105 to be replaced by a radial through-passage in the central region of the valve closure body 41, said through-passage permanently connecting the valve space 73, connected to the outlet connecting branch 21, to a preferably annular cavity which is bounded by the valve stem 67 in the radially inward direction and extends axially from said radial through-passage as far as the sealing seat body 103. By means of the transverse bore 108, the pressure-equalizing channel 82 is then permanently connected to the outlet connecting branch 21 and thus to the surroundings.

Furthermore, it is also conceivable, in the case of a valve body/valve seat arrangement according to FIGS. 4 and 5, for the pressure-equalizing space 80 to be kept permanently in connection with the supply-line-side channel part 78, for example via a pressure-equalizing channel 82 according to FIGS. 1 to 3. The pressure-active surface of the valve closure body 41 which bounds the pressure-compensating space is smaller than the pressure-active surface of the valve closure body 41 which is directed toward the channel part 78.

What is claimed is:

1. A sanitary fitting comprising two outlet connecting branches (20, 21) for two different liquids separate from one another and into which two channel systems (50, 56), which are routed separately from one another through a common fitting housing (1), open out, each channel system being provided with at least one valve arrangement (17, 53), each valve arrangement being functionally separate from the other, wherein a lifting-valve arrangement (17) is provided for at least one of the channel systems (56) routed through the fitting housing (1), said lifting-valve arrangement having a closure body (41) which executes a lifting movement, initiated by the pressure actuation of an actuating element (44), which is connected to said closure body and acts in the direction of the lifting movement, and hydraulically acting means (80, 82, 84, 108, 110) are provided for reducing the force of the pressure actuation.

2. The sanitary fitting as claimed in claim 1, wherein the valve closure body (41) is guided, and sealed, in a piston-like manner in an inner sealing body (70) of the fitting housing (1) by way of a valve stem (67) fastened on it, the hydraulic means having a connection which runs between a part (78) of the relevant channel system (56) which is to be closed by the valve closure body and a counterpressure space (80), which is bounded by the sealing body (70) of the fitting housing (1) and the valve closure body (41).

3. The sanitary fitting as claimed in claim 2, wherein the hydraulic connection comprises a bore (82) which is routed axially through the closure body (41) and at least part of the valve stem and is connected to the counterpressure space (80) by at least one transverse bore (84).

4. The sanitary fitting as claimed in claim 1, wherein provided on the closure body (41) is a pilot-valve arrangement (97–110), having a valve stem (67) which can be displaced relative to the valve closure body (41), so that the valve stem forms a control element, and is intended for opening and closing the hydraulic connection routed through it.

5. The sanitary fitting as claimed in claim 1, wherein a compensator arrangement (18) is provided, in addition to the lifting-valve arrangement (17), for the alterable setting of the magnitude of a flow cross section in a channel system (56, 78) for connecting to a liquid enriched with carbon dioxide.

6. The sanitary fitting as claimed in claim 5, wherein the compensator arrangement (18) has an elongate flow body (58) which is enclosed over at least part of its length by a channel part (16), widening in the flow direction, and which butts against a stop (60), which extends into the channel and can be adjusted in its position of contact with the flow body (58), the adjustment position of the stop determines the flow cross section between said channel part (16) and the flow body (58).

7. The sanitary fitting as claimed in claim 1, having a column-like fitting housing (1) which has a plurality of housing parts (3–5) which are arranged one above the other and are sealed such that they can be rotated in relation to one another, wherein the uppermost housing part is designed as a housing head (5) having the outflow connecting branch (21), and it comprises the actuating element (44), with upwardly directed actuating surface, which is intended for the pressure actuation, the second outflow connecting branch (21) being integrally formed on the ad part (4), merging into a base part (3).

8. The lifting-valve arrangement, in particular for a sanitary fitting as claimed in claim 1, having a valve closure body (41) which is guided with sealing action in a housing (70), can execute lifting movements and is enclosed by a valve seat body (15), it being the case that the lifting movement can be initiated by the pressure actuation of an actuating element (44), which is connected to said valve closure body and acts in the direction of the lifting movement, which comprises hydraulically acting means (80, 82, 84, 108, 110) for reducing the force of the pressure actuation, having a pressure-equalizing channel (82) which runs from a front end surface (79) of the valve closure body (41), said end surface being directed toward a channel part (78) which is to be shut off, to a pressure-equalizing space (80) adjacent to the rear end surface (81) of said valve closure body.

9. The lifting-valve arrangement as claimed in claim 8, wherein the valve closure body (41) has a closure part (65) and a guide piston (66), and the pressure-equalizing channel runs axially through the valve closure body and part of a valve stem (67) connected thereto, at least one transverse bore (84, 108) in the valve stem (67) forming a connecting section of the pressure-equalizing channel (82).

10. The lifting-valve arrangement as claimed in claim 8, wherein, at least in a certain position of the valve closure body (41), the pressure-equalizing channel (82) is connected to the atmosphere via a closeable venting channel (105).

11. The lifting-valve arrangement as claimed in claim 8, wherein the valve seat body (15) has a cylindrical valve seat surface (47), and provided on the rear end surface (81) is at least one spacer protuberance (85), which forms a stop on an inner transverse surface (83) of the sealing body (70).

12. The lifting-valve arrangement as claimed in claim 8, wherein the valve stem (67), which encloses the pressure-equalizing channel (82), is guided in an axially displaceable manner in the valve closure body (41) and is in drive connection with the valve closure body (41) via a stop (106, 107), it being the case that, in the region of the pressure-equalizing space (80) and on the closure part (65) of the valve closure body (41), the valve stem (67) has in each case one closure device (97, 98) of a pilot-valve system, provided for the pressure-equalizing channel (82), such that, in the valve closure position, the closure device (98) on the closure part (65) of the valve closure body (41) is closed, while the other closure device (97) releases a connection between the pressure-equalizing space (80) and the atmosphere, and a displacement of the valve stem (67) initiated by the actuating element (44) closes the closure device (97) on the pressure-equalizing space (80) and opens the closure device (98) on the closure part (65) of the valve closure body (41).

* * * * *